US012199380B2

(12) United States Patent
Meng et al.

(10) Patent No.: US 12,199,380 B2
(45) Date of Patent: Jan. 14, 2025

(54) ELECTRICAL CONNECTOR WITH THREE TERMINAL SETS EACH HAVING STAGGERED SIGNAL AND GROUND TERMINALS

(71) Applicant: JESS-LINK PRODUCTS CO., LTD., New Taipei (TW)

(72) Inventors: Song Meng, New Taipei (TW); Hsu-Feng Chang, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 347 days.

(21) Appl. No.: 17/889,126

(22) Filed: Aug. 16, 2022

(65) Prior Publication Data

US 2023/0054734 A1 Feb. 23, 2023

(30) Foreign Application Priority Data

Aug. 18, 2021 (TW) ................................ 110209736

(51) Int. Cl.
*H01R 13/6471* (2011.01)
*H01R 13/24* (2006.01)
*H01R 13/41* (2006.01)

(52) U.S. Cl.
CPC ..... *H01R 13/6471* (2013.01); *H01R 13/2442* (2013.01); *H01R 13/41* (2013.01)

(58) Field of Classification Search
CPC . H01R 13/6471; H01R 13/2442; H01R 13/41
See application file for complete search history.

(56) References Cited

U.S. PATENT DOCUMENTS 6,582,247 B2 * 6/2003 Siemon .............. H01R 13/6461 439/405
7,322,855 B2 * 1/2008 Mongold ........... H01R 13/6587 439/607.05

* cited by examiner

*Primary Examiner* — Vanessa Girardi

(57) ABSTRACT

An electrical connector includes an insulating case and a first terminal set including a first grounding terminal set, a first signal terminal set and a second signal terminal set arranged at intervals in the horizontal direction. The first grounding terminal set includes a first grounding terminal, a second grounding terminal and a third grounding terminal. The first signal terminal set is vertically staggered between the first grounding terminal and the second grounding terminal and includes a first signal terminal and a second signal terminal arranged at intervals in the vertical direction. The second signal terminal set is vertically staggered between the second grounding terminal and the third grounding terminal and includes a third signal terminal and a fourth signal terminal arranged at intervals in the vertical direction.

11 Claims, 6 Drawing Sheets

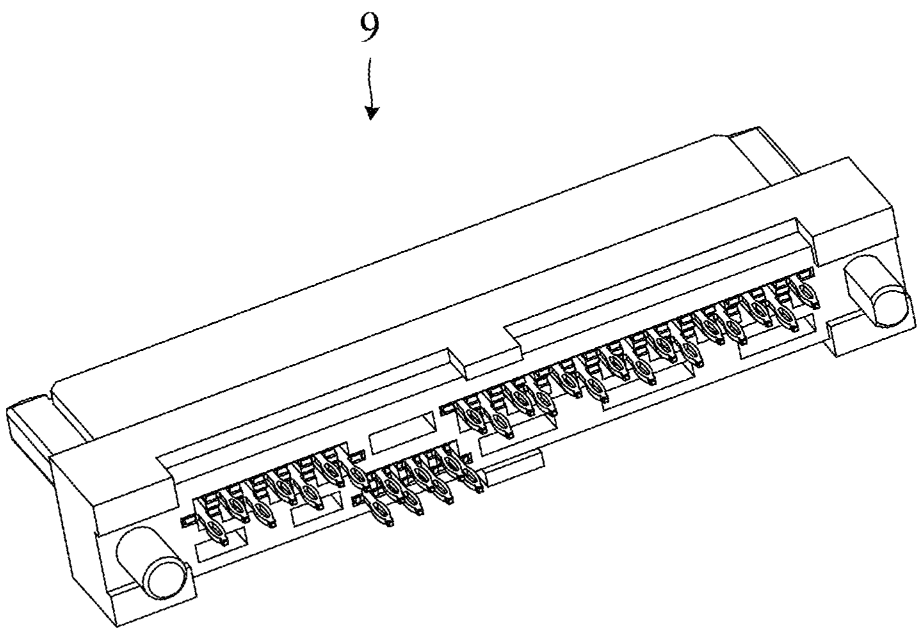
FIG. 1A --Prior Art--
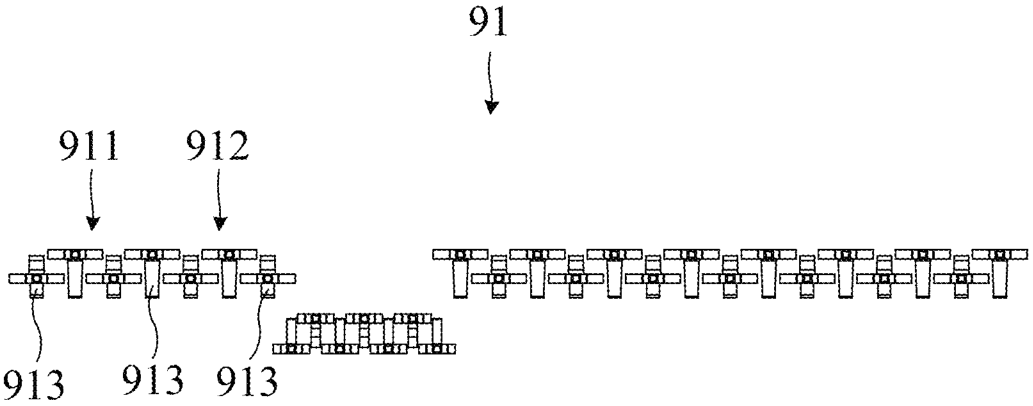
FIG. 1B --Prior Art--

ELECTRICAL CONNECTOR WITH THREE TERMINAL SETS EACH HAVING STAGGERED SIGNAL AND GROUND TERMINALS

BACKGROUND OF THE INVENTION

1. Field of the Invention

The present invention relates to an electrical connector, and more particularly, to an electrical connector that can improve transmission quality and stability.

2. Description of the Prior Art

Connectors are considered as connecting components and accessories for electrical signals, and the electronic devices translate and transmit the signal to each other through cables and connectors. That is to say, the connectors are the communicating bridges for the signals. The connectors are widely applied to cars and computer peripheral and communicating data applications, industries, military and aerospace industry, transportation, consumer electronics, medical treatments, instruments, commercial equipment and so on. Therefore, the connectors play an important role in many fields.

SAS connector (Serial Attached SCSI connector) is one of the common connectors. The SAS connector is usually used in computer peripheral components such as hard disks and CD-ROMs for data transmission. In general, the SAS connector contains two terminal sets, and each terminal set contains two signal differential terminal sets. Furthermore, each terminal set includes ground terminals (usually three ground terminals) to separate the signal differential terminal sets, so as to avoid crosstalk between the signal differential terminal sets.

As shown in FIG. 1A and FIG. 1B, most of the terminals in the terminal set 91 of the SAS electrical connector 9 currently on the market are arranged in two rows. Although the ground terminal 913 of the terminal set 91 is located between the two differential signal terminal set 911 and 912, one of the signal terminals of the two differential signal terminal set 911 and 912 cannot be completely separated by the ground terminal. Furthermore, when the terminals are arranged in two rows, the distance between each two terminals is relatively close, and the terminals of the upper and lower rows even partially overlap. Therefore, there is still an internal crosstalk phenomenon in the terminal sets of the current SAS connector. In addition, with the rapid development of the industry, the way of data transmission is gradually moving towards high-frequency and high-speed transmission, and the signal frequency carried by the SAS connector is also getting higher and higher. Therefore, the crosstalk phenomenon of the SAS connector will be more serious, thereby reducing the signal transmission quality, efficiency and stability.

Therefore, it is necessary to improve the structure of the electrical connector to contain the transmission efficiency and stability of the electrical connector.

SUMMARY OF THE INVENTION

Therefore, the present invention provides an electrical connector to solve the problems of the prior art.

In one embodiment, the electrical connector includes an insulating case and a first terminal set. The first terminal set is configured in the insulating case, and all terminals of the first terminal set are arranged at intervals along a horizontal direction. The first terminal set includes a first ground terminal set, a first signal terminal set and a second signal terminal set. The first ground terminal set includes a first ground terminal, a second ground terminal and a third ground terminal. The first signal terminal set is vertically staggered from the first ground terminal set and disposed between the first ground terminal and the second ground terminal. The first signal terminal set includes a first signal terminal and a second signal terminal arranged at intervals in a vertical direction. The second signal terminal set is vertically staggered from the first ground terminal set and configured between the second ground terminal and the third ground terminal. The second signal terminal set includes a third signal terminal and a fourth signal terminal arranged at intervals in the vertical direction. Wherein, the first terminal set has a first plane, a second plane and a third plane arranged in sequence along the vertical direction. The second signal terminal and the fourth signal terminal are located on the first plane, the first signal terminal and the third signal terminal are located on the second plane, and the first ground terminal, the second ground terminal and the third ground terminal are located on the third plane.

Wherein, the connecting portions of the first ground terminal set, the first signal terminal set and the second signal terminal set are located on the same plane.

Wherein, the first signal terminal, the second signal terminal, the third signal terminal and the fourth signal terminal include a bent portion respectively. The bending directions of the bent portions of the first signal terminal and the second signal terminal are symmetrical with each other, and the bending directions of the bent portions of the third signal terminal and the fourth signal terminal are symmetrical with each other.

Wherein, the length of the first signal terminal is the same as the length of the second signal terminal, and the length of the third signal terminal is the same as the length of the fourth signal terminal.

Wherein, the first signal terminal, the second signal terminal and the first ground terminal are sequentially arranged in stepped manner, and the third signal terminal, the fourth signal terminal and the second ground terminal are sequentially arranged in stepped manner.

The electrical connector of the present invention further includes a second terminal set configured in the insulating case and adjacent to the first terminal set. All terminals of the second terminal set are arranged at intervals along the horizontal direction. The second terminal set includes a second ground terminal set, a third signal terminal set and a fourth signal terminal set. The second ground terminal set includes a fourth ground terminal, a fifth ground terminal and sixth ground terminal. The third signal terminal set is vertically staggered from the second ground terminal set and configured between the fourth ground terminal and the fifth ground terminal. The third signal terminal set includes a fifth signal terminal and a sixth signal terminal arranged at intervals in the vertical direction. The fourth signal terminal set is vertically staggered from the second ground terminal set and configured between the fifth ground terminal and the sixth ground terminal. The fourth signal terminal set includes a seventh signal terminal and an eighth signal terminal arranged at intervals in the vertical direction.

Wherein, the sixth signal terminal and the eighth signal terminal are located on the third plane.

Wherein, the second terminal set has a fourth plane and a fifth plane arranged in sequence along the vertical direction. The fifth signal terminal and the seventh signal terminal are located on the fourth plane, and the fourth ground terminal, the fifth ground terminal and the sixth ground terminal are located on the fifth plane.

Wherein, the fifth signal terminal, the sixth signal terminal and the fourth ground terminal are sequentially arranged in stepped manner, and the seventh signal terminal, the eighth signal terminal and the fifth ground terminal are sequentially arranged in stepped manner.

Wherein, the connecting portions of the second ground terminal set, the third signal terminal set and the fourth signal terminal set are located on the same plane.

Wherein, the insulating case includes a first sidewall and a second sidewall opposite to the first sidewall. The first sidewall and the second sidewall form a slot. The first sidewall includes a plurality of first terminal grooves, and the second sidewall includes a plurality of second terminal grooves. The connecting portions of the first ground terminal set, the first signal terminal set and the second signal terminal set are respectively disposed in the first terminal grooves, and the connecting portions of the second ground terminal set, the third signal terminal set and the fourth signal terminal set are respectively disposed in the second terminal grooves.

In summary, the terminal set of the electrical connector of the present invention can increase the distance between the signal terminals through the arrangement of three rows and the staggered and non-overlapping arrangement, so as to reduce the crosstalk inside the terminal set and improve signal transmission quality and stability. Moreover, the electrical connector of the present invention can also block the interference between the two terminal sets through the ground terminals located at both ends of the terminal set, thereby improving the transmission quality and stability. Furthermore, the differential terminal set of the terminal set can also be designed as symmetrical bending and equal length to improve the signal transmission quality and efficiency.

BRIEF DESCRIPTION OF THE APPENDED DRAWINGS

FIG. 1A is a schematic diagram illustrating a prior art connector.

FIG. 1B is a schematic diagram illustrating the terminal set of the connector in FIG. 1A.

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

Figure 2:
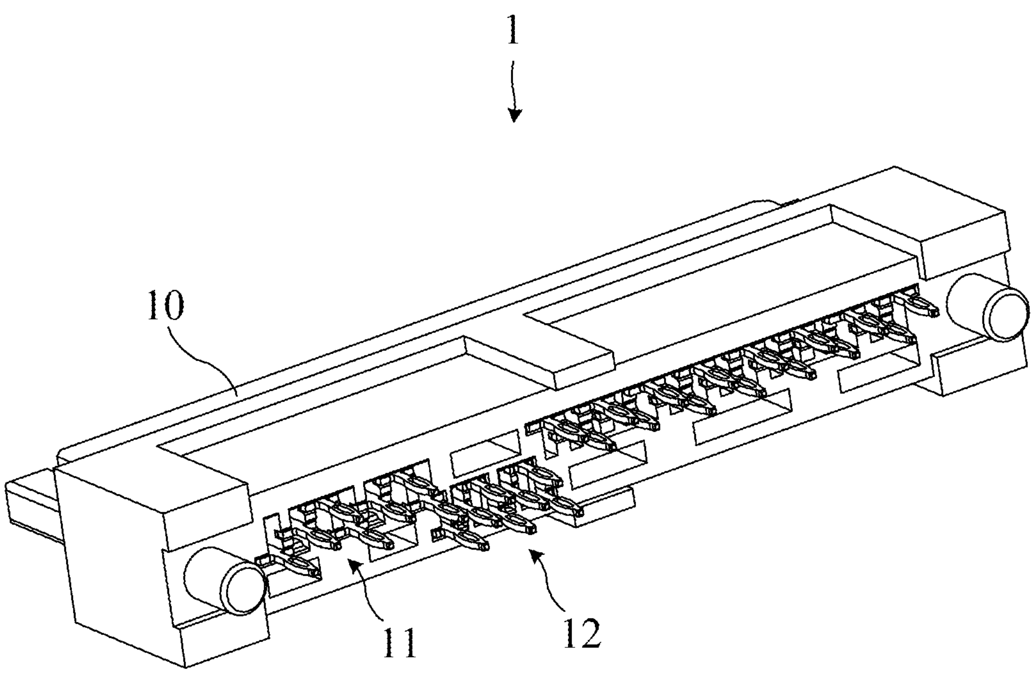
FIG. 2 is an assembly schematic diagram illustrating an electrical connector according to an embodiment of the present invention.
Figure 3:
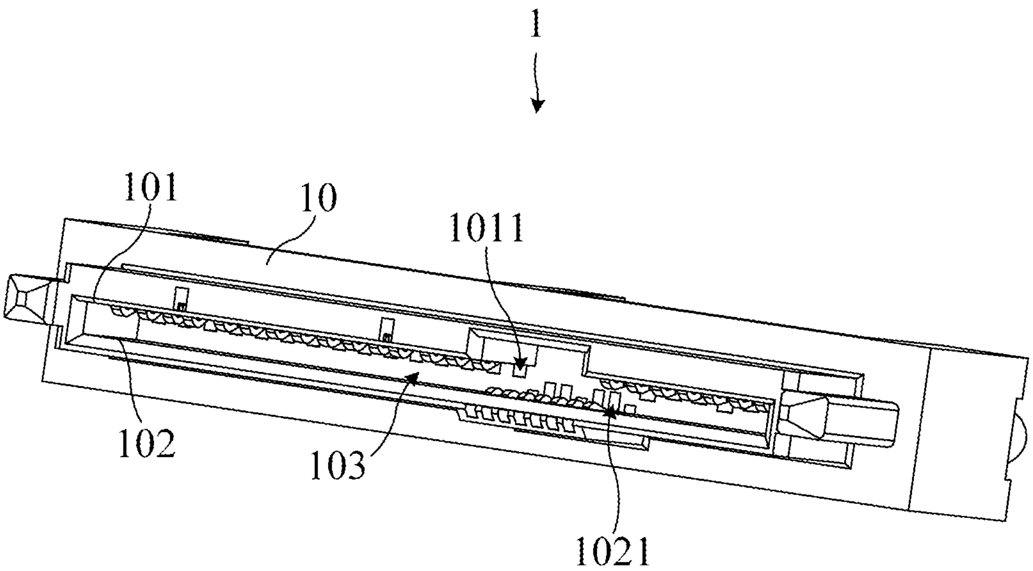
FIG. 3 is an assembly schematic diagram illustrating the electrical connector in another perspective of FIG. 2.
Figure 4:
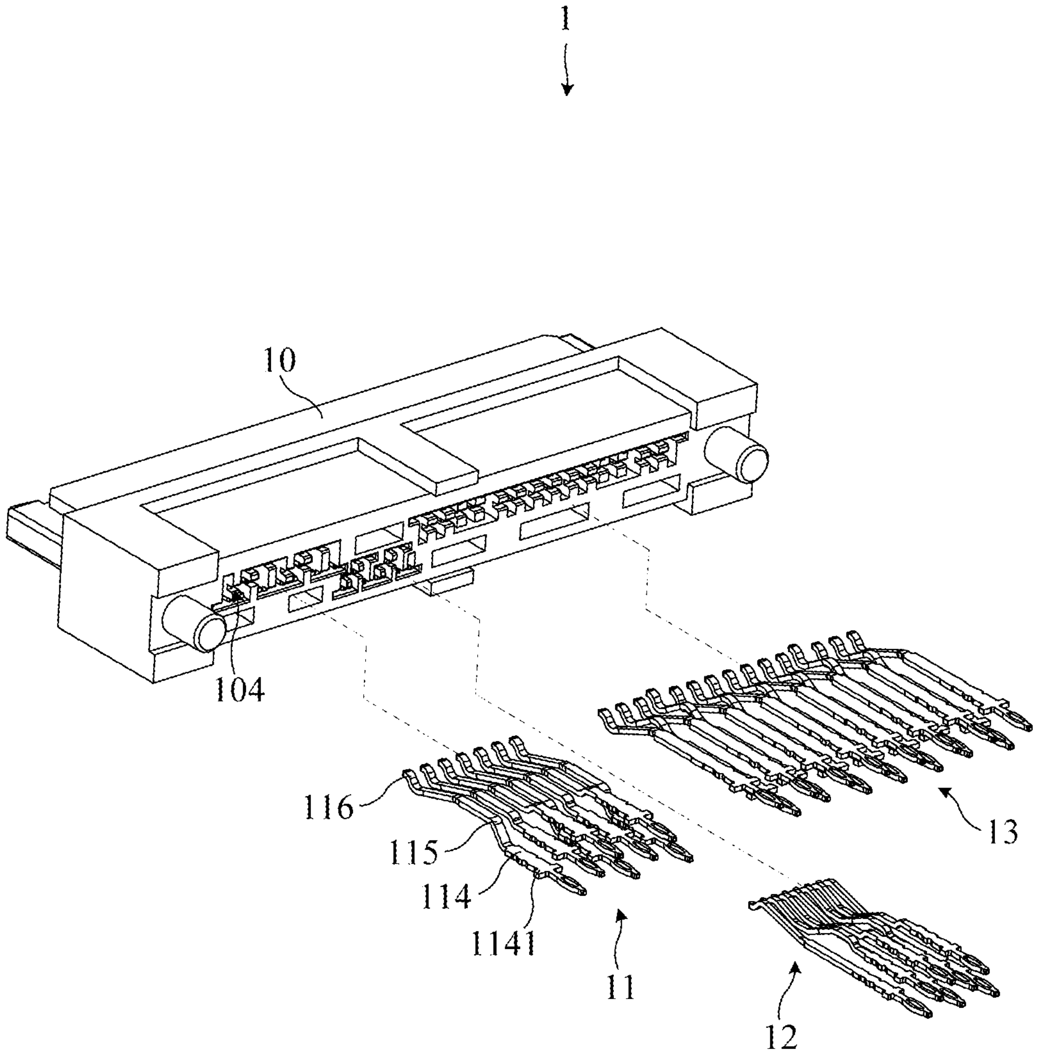
FIG. 4 is an exploded diagram illustrating the electrical connector of FIG. 2.
Figure 5:
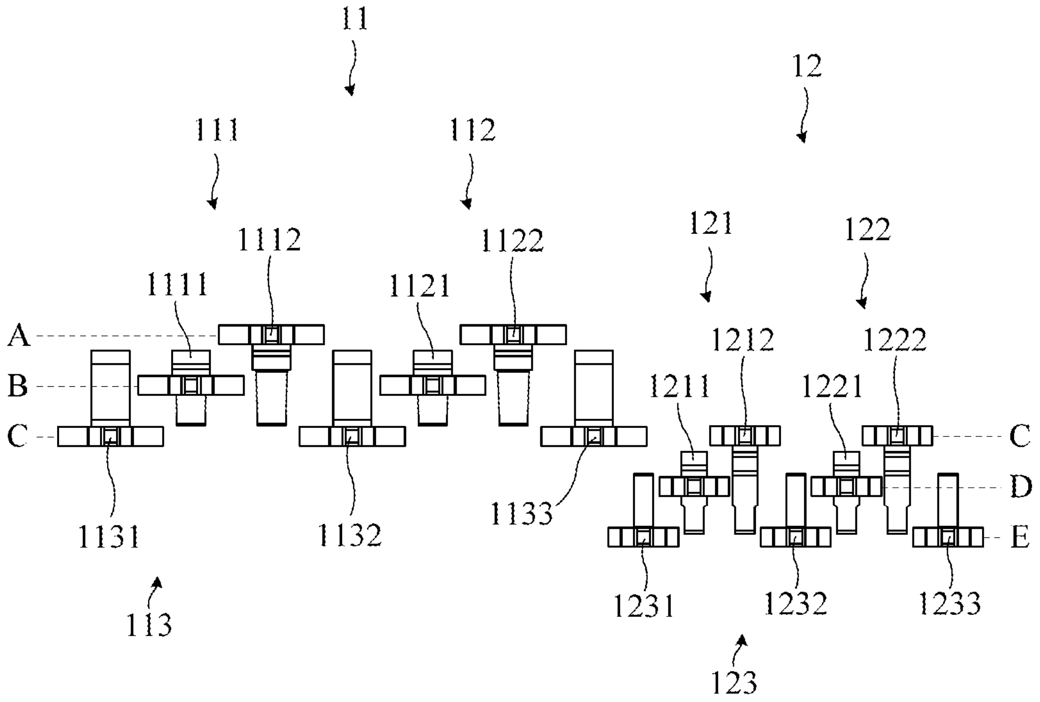
FIG. 5 is a schematic diagram illustrating the first terminal set and the second terminal set of the electrical connector in FIG. 2.

Please refer from FIG. 2 to FIG. 5. FIG. 2 is an assembly schematic diagram illustrating an electrical connector 1 according to an embodiment of the present invention. FIG. 3 is an assembly schematic diagram illustrating the electrical connector 1 in another perspective of FIG. 2. FIG. 4 is an exploded diagram illustrating the electrical connector 1 of FIG. 2. FIG. 5 is a schematic diagram illustrating the first terminal set 11 and the second terminal set 12 of the electrical connector 1 in FIG. 2. As shown from FIG. 2 to FIG. 5, in this embodiment, the electrical connector 1 includes an insulating case 10, a first terminal set 11, a second terminal set 12 and a third terminal set 13. The insulating case 10 includes a through opening. The first terminal set 11, the second terminal set 12 and the third terminal set 13 pass through the through opening and be disposed in the insulating case 10. The first terminal set 11, the second terminal set 12 and the third terminal set 13 are disposed adjacent to each other, and the second terminal set 12 is located between the first terminal set 11 and the third terminal set 13. In practice, the electrical connector 1 can be a SAS socket. The electrical connector of the present invention is not limited to include three sets of terminals, but can also include more than four sets of terminals.

As shown in FIG. 5, in this embodiment, all terminals of the first terminal set 11 are arranged at intervals along the horizontal direction. The first terminal set 11 includes a first signal terminal set 111, a second signal terminal set 112 and a first ground terminal set 113. In practice, the first signal terminal set 111 and the second signal terminal set 112 can be differential signal terminals. The first signal terminal set 111 is configured to transmit the differential signal and includes a first signal terminal 1111 and a second signal terminal 1112. The second signal terminal set 112 is configured to transmit the differential signal and includes a third signal terminal 1121 and a fourth signal terminal 1122. The first ground terminal set 113 includes a first ground terminal 1131, a second ground terminal 1132 and a third ground terminal 1133, and the first ground terminal 1131, the second ground terminal 1132 and the third ground terminal 1133 are arranged horizontally and in parallel. The first signal terminal set 111 is vertically staggered from the first ground terminal set 113 and configured between the first ground terminal 1131 and the second ground terminal 1132. The first signal terminal 1111 and the second signal terminal 1112 of the first signal terminal set 111 are arranged at intervals in the vertical direction. The second signal terminal set 112 is vertically staggered from the first ground terminal set 113 and configured between the second ground terminal 1132 and the third ground terminal 1133. The third signal terminal 1121 and the fourth signal terminal 1122 of the second signal terminal set 112 are arranged at intervals in the vertical direction.

In this embodiment, the first terminal set 11 is arranged in three rows, and the first terminal set 11 has a first plane A, a second plane B and a third plane C arranged in sequence along the vertical direction. As shown in FIG. 5, the second signal terminal 1112 and the fourth signal terminal 1122 are located on the first plane A, the first signal terminal 1111 and the third signal terminal 1121 are located on the second plane B, and the first ground terminal 1131, the second ground terminal 1132 and the third ground terminal 1133 are located on the third plane C. The first ground terminal 1131, the first signal terminal 1111 and the second signal terminals 1112 are arranged staggered from each other, and the second ground terminal 1132, the third signal terminal 1121 and the fourth signal terminal 1122 are arranged staggered from each other. That is to say, in addition to the signal terminal set and the ground terminal set of the first terminal set are arranged at intervals in the vertical direction, and the signal terminals in each signal terminal set are also arranged at intervals in the vertical direction.

In practice, the first ground terminal 1131, the first signal terminal 1111 and the second signal terminal 1112 can be sequentially arranged in stepped manner, and the second ground terminal 1132, the third signal terminal 1121 and the fourth signal terminal 1122 are sequentially arranged in stepped manner. All adjacent terminals of the first terminal set 11 are not vertically overlapped and can be completely staggered, and the second ground terminal 1132 separates the first signal terminal set 111 from the second signal terminal set 112. Therefore, the distance between the first signal terminal set 111 and the second signal terminal set 112 is larger, to avoid crosstalk between the first signal terminal set 111 and the second signal terminal set 112, thereby improving signal transmission quality and stability.

In this embodiment, all terminals of the second terminal set 12 adjacent to the first terminal set 11 are arranged at intervals in the horizontal direction. The second terminal set 12 includes a third signal terminal set 121, a fourth signal terminal set 122 and a second ground terminal set 123. In practice, the third signal terminal set 121 and the fourth signal terminal set 122 can be differential signal terminals. The third signal terminal set 121 is configured to transmit the differential signal and includes a fifth signal terminal 1211 and a sixth signal terminal 1212. The fourth signal terminal set 122 is configured to transmit the differential signal and includes a seventh signal terminal 1221 and an eighth signal terminal 1222. The second ground terminal set 123 includes a fourth ground terminal 1231, a fifth ground terminal 1232 and a sixth ground terminal 1233. The fourth ground terminal 1231, the fifth ground terminal 1232 and the sixth ground terminal 1233 are arranged horizontally and in parallel. The third signal terminal set 121 is vertically staggered from the second ground terminal set 123 and configured between the fourth ground terminal 1231 and the fifth ground terminal 1232. The fifth signal terminal 1211 and the sixth signal terminal 1212 of the third signal terminal set 121 are arranged at intervals in the vertical direction. The fourth signal terminal set 122 is vertically staggered from the second ground terminal set 123 and configured between the fifth ground terminal 1232 and the sixth ground terminal 1233. The seventh signal terminal 1221 and the eighth signal terminal 1222 of the fourth signal terminal set 122 are arranged at intervals in the vertical direction.

In this embodiment, the second terminal set 12 is also arranged in three rows, and the second terminal set 12 has a fourth plane D and a fifth plane E arranged in sequence along the vertical direction. Wherein, the fourth plane D and a fifth plane E are arranged in sequence along the third plane C. As shown in FIG. 5, the sixth signal terminal 1212 and the eighth signal terminal 1222 are located on the third plane C, the fifth signal terminal 1211 and the seventh signal terminal 1221 are located on the fourth plane D, and the fourth ground terminal 1231, the fifth ground terminal 1232 and the sixth ground terminal 1233 are located on the fifth plane E. The fourth ground terminal 1231, the fifth signal terminal 1211 and the sixth signal terminals 1212 are arranged staggered from each other, and the fifth ground terminal 1232, the seventh signal terminal 1221 and the eighth signal terminal 1222 are arranged staggered from each other. That is to say, in addition to the signal terminal set and the ground terminal set of the second terminal set are arranged at intervals in the vertical direction, and the signal terminals in each signal terminal set are also arranged at intervals in the vertical direction.

In practice, the fourth ground terminal 1231, the fifth signal terminal 1211 and the sixth signal terminal 1212 can be sequentially arranged in stepped manner, and the fifth ground terminal 1232, the seventh signal terminal 1221 and the eighth signal terminal 1222 are sequentially arranged in stepped manner. That is to say, all adjacent terminals of the second terminal set 12 are not vertically overlapped and can be completely staggered, and the fifth ground terminal 1232 separates the third signal terminal set 121 from the fourth signal terminal set 122. Therefore, the distance between the third signal terminal set 121 and the fourth signal terminal set 122 is larger, to avoid crosstalk between the third signal terminal set 121 and the fourth signal terminal set 122, thereby improving signal transmission quality and stability.

Please refer from FIG. 2 to FIG. 5 again. As shown in FIG. 5, in this embodiment, the first ground terminal set 113 of the first terminal set 11 and the sixth signal terminal 1212 and the eighth signal terminal 1222 of the second terminal set 12 are located on the same plane (that is the third plane C). In practice, the second terminal set 12 is adjacent to the first terminal set 11, and the third ground terminal 1133 of the first ground terminal set 113 is adjacent to the sixth signal terminal 1212 of the second terminal set 12. Therefore, the third ground terminal 1133 of the first terminal set 11 and the fourth ground terminal 1231 of the second terminal set 12 can avoid crosstalk between the second signal terminal set 122 and the third signal terminal set 121, thereby improving signal transmission quality and stability.

As shown in FIG. 3 and FIG. 4, each of terminals of the electrical connector 1 includes a main body portion 114, a bent portion 115 and a connecting portion 116. The bent portion 115 is located between the main body portion 114 and the connecting portion 116. The pin of the terminal is located on the end of the main body portion 114. The insulating case 10 further includes a first sidewall 101 and a second sidewall 102. The second sidewall 102 is opposite to the first sidewall 101, and the first sidewall 101 and the second sidewall 102 form a slot 103 for the plug to be inserted. In this embodiment, the first sidewall 101 includes a plurality of first terminal grooves 1011 for containing the connecting portions 116 of the terminals of the first terminal set 11, and the second sidewall 102 includes a plurality of second terminal grooves 1021 for containing the connecting portions 116 of the terminals of the second terminal set 12. In practice, the first sidewall 101 further can include, but it is not limited to, a plurality of third terminal grooves for containing the connecting portions of the third terminal set 13, and the third terminal grooves can also be configured on the second sidewall. In another embodiment, the first terminal grooves, the second terminal grooves and the third terminal grooves can be configured on the first sidewall or the second sidewall simultaneously.

Moreover, in this embodiment, the other side of the insulating case 10 relative to the slot 103 includes a plurality of fixing grooves 104, and the main body portion 114 of each terminal of the electrical connector 1 further includes a fixing structure 1141 corresponding to the fixing groove 104. In practice, the arrangement of the fixing grooves 104 can be corresponding to the arrangement of terminals of the first terminal set 11 and the second terminal set 12, and each of the terminals of the first terminal set 11 and the second terminal set 12 can be engaged in the fixing groove 104 of the insulating case 10 through the fixing structure 1141. It should be noted that the shapes of the fixing groove and the fixing structure are not limited to the in-line shape in the figure, and the shapes of the fixing groove and the fixing structure can also be any shape corresponding to each other.

Figure 6:
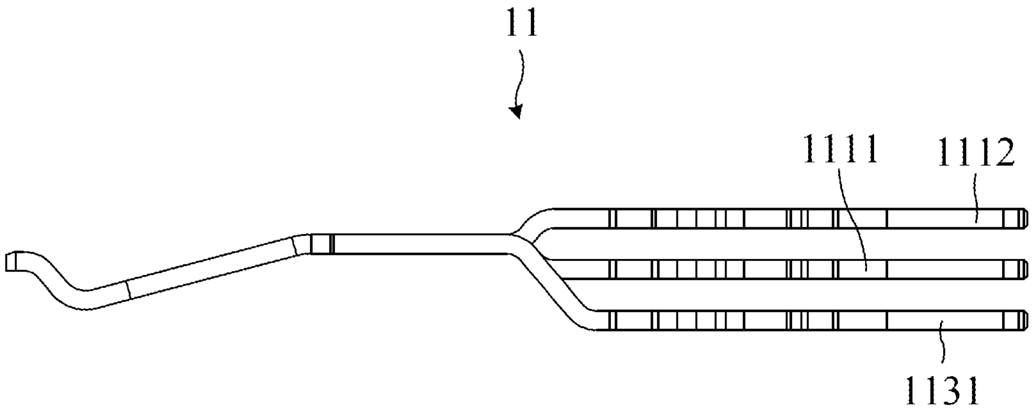
FIG. 6 is a side view illustrating the first terminal set of the electrical connector in FIG. 5.

Please refer to FIG. 5 and FIG. 6. FIG. 6 is a side view illustrating the first terminal set 11 of the electrical connector 1 in FIG. 5. Since the position of the second signal terminal set 112 is corresponding to the position of the first signal terminal set 111, and the first ground terminal 1131, the second ground terminal 1132 and the third ground terminal 1133 are located on the same plane, the FIG. 6 only illustrates the first signal terminal set 111 and the first ground terminal 1131. In this embodiment, the connecting portions 116 of the terminals of the first signal terminal set 111, the second signal terminal set 112 and the first ground terminal set 113 of the first terminal set 11 are arranged horizontally and in parallel. In practice, the main body portions 114 of all terminals of the first terminal set 11 are arranged in tree rows. The bent portions 115 of all the terminals of the first terminal set 11 are vertically bent, so that the connecting portions 116 of all the terminals are arranged horizontally and in parallel, and the connecting portions 116 of all the terminals are respectively disposed in the first terminal grooves 1011 of the insulating case 10. At this time, the connecting portions of the first terminal set 11 are sequentially arranged in the first ground terminal 1131, the first signal terminal 1111, the second signal terminal 1112, the second ground terminal 1132, the third signal terminal 1121, the fourth signal terminal 1122 and the third ground terminal 1133.

As shown in FIG. 6, in this embodiment, the bending directions of the bent portions 115 of the first signal terminal 1111 and the second signal terminal 1112 are symmetrical with each other, and the lengths of the first signal terminal 1111 and the second signal terminal 1112 are the same. The bending directions of the bent portions 115 of the third signal terminal 1121 and the fourth signal terminal 1122 are symmetrical with each other, and the lengths of the third signal terminal 1121 and the fourth signal terminal 1122 are the same. In practice, the position of the first terminal grooves 1011 of the insulating case 10 can be located in the middle position between the first row and the second row of the first terminal set 11. Therefore, the bent portion 115 of the first signal terminal 1111 can be bent upward and the bent portion 115 of the second signal terminal 1112 can be bent downward, so that the connecting portion 116 of the first signal terminal 1111 and the second signal terminal 1112 can be accommodated in the first terminal grooves 1011. Moreover, since the lengths of the first signal terminal 1111 and the second signal terminal 1112 are the same, the voltage difference value between the first signal terminal 1111 and the second signal terminal 1112 is zero when the first signal terminal set 111 transmits the signal, thereby increasing the signal transmission stability.

Similarly, the bent portion 115 of the third signal terminal 1121 can be bent upward and the bent portion 115 of the fourth signal terminal 1122 can be bent downward, so that the connecting portion 116 of the third signal terminal 1121 and the fourth signal terminal 1122 can be accommodated in the first terminal grooves 1011. Furthermore, since the lengths of the third signal terminal 1121 and the fourth signal terminal 1122 are the same, the voltage difference value between the third signal terminal 1121 and the fourth signal terminal 1122 is zero when the second signal terminal set 112 transmits the signal, thereby increasing the signal transmission stability.

Figure 7:
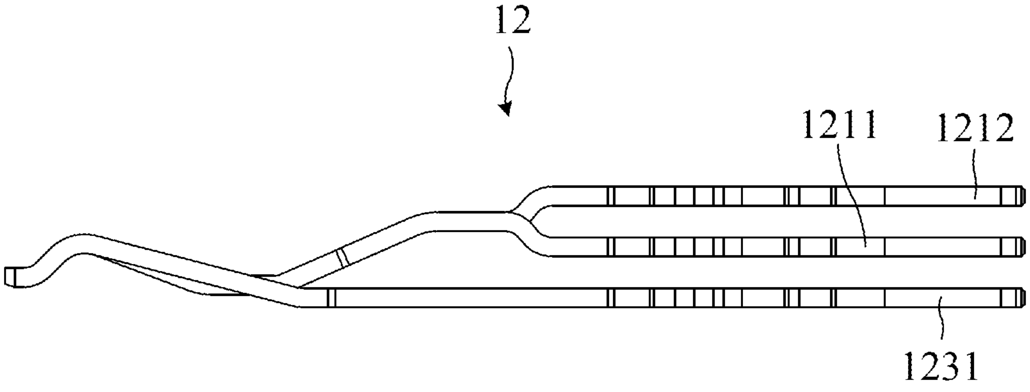
FIG. 7 is a side view illustrating the second terminal set of the electrical connector in FIG. 5.

Please refer to FIG. 5 and FIG. 7. FIG. 7 is a side view illustrating the second terminal set 12 of the electrical connector 1 in FIG. 5. Since the position of the fourth signal terminal set 122 is corresponding to the position of the third signal terminal set 121, and the fourth ground terminal 1231, the fifth ground terminal 1232 and the sixth ground terminal 1233 are located on the same plane, the FIG. 7 only illustrates the third signal terminal set 121 and the fourth ground terminal 1231. In this embodiment, the connecting portions 116 of the terminals of the third signal terminal set 121, the fourth signal terminal set 122 and the second ground terminal set 123 of the second terminal set 12 are arranged horizontally and in parallel. In practice, the bent portions 115 of all the terminals of the second terminal set 12 are vertically bent, so that the connecting portions 116 of all the terminals are arranged horizontally and in parallel, and the connecting portions 116 of all the terminals are respectively disposed in the second terminal grooves 1021 of the insulating case 10. At this time, the connecting portions of the second terminal set 12 are sequentially arranged in the fourth ground terminal 1231, the fifth signal terminal 1211, the sixth signal terminal 1212, the fifth ground terminal 1232, the seventh signal terminal 1221, the eighth signal terminal 1222 and the sixth ground terminal 1233.

As shown in FIG. 7, in this embodiment, the bending directions of the bent portions 115 of the fifth signal terminal 1211 and the sixth signal terminal 1212 are symmetrical with each other, and the lengths of the fifth signal terminal 1211 and the sixth signal terminal 1212 are the same. The bending directions of the bent portions 115 of the seventh signal terminal 1221 and the eighth signal terminal 1222 are symmetrical with each other, and the lengths of the seventh signal terminal 1221 and the eighth signal terminal 1222 are the same. In practice, the position of the second terminal grooves 1021 of the insulating case 10 can be located on the third row of the second terminal set 12, but it is not limited hereto. The bent portions 115 of the fifth signal terminal 1211 and the sixth signal terminal 1212 can be bent upward and downward respectively to the middle position of the first row and the second row of the second terminal set 12, and then extend to the third row at the same time, so that the connecting portions 116 of the fifth signal terminal 1211 and the sixth signal terminal 1212 can be accommodated in the second terminal grooves 1021. Moreover, since the lengths of the fifth signal terminal 1211 and the sixth signal terminal 1212 are the same, the voltage difference value between the fifth signal terminal 1211 and the sixth signal terminal 1212 is zero when the third signal terminal set 121 transmits the signal, thereby increasing the signal transmission stability.

Similarly, the bent portions 115 of the seventh signal terminal 1221 and the eighth signal terminal 1222 can be bent upward and downward respectively to the middle position of the first row and the second row of the second terminal set 12, and then extend to the third row at the same time, so that the connecting portions 116 of the seventh signal terminal 1221 and the eighth signal terminal 1222 can be accommodated in the second terminal grooves 1021. Furthermore, since the lengths of the seventh signal terminal 1221 and the eighth signal terminal 1222 are the same, the voltage difference value between the seventh signal terminal 1221 and the eighth signal terminal 1222 is zero when the fourth signal terminal set 122 transmits the signal, thereby increasing the signal transmission stability.

In summary, the terminal set of the electrical connector of the present invention can increase the distance between the signal terminals through the arrangement of three rows and the staggered and non-overlapping arrangement, so as to reduce the crosstalk inside the terminal set and improve signal transmission quality and stability. Moreover, the electrical connector of the present invention can also block the interference between the two terminal sets through the ground terminals located at both ends of the terminal set, thereby improving the transmission quality and stability. Furthermore, the differential terminal set of the terminal set can also be designed as symmetrical bending and equal length to improve the signal transmission quality and efficiency.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An electrical connector, comprising:

an insulating case; and a first terminal set, configured in the insulating case, all terminals of the first terminal set being arranged at intervals along a horizontal direction, the first terminal set comprising:

a first ground terminal set, comprising a first ground terminal, a second ground terminal and a third ground terminal;

a first signal terminal set, vertically staggered from the first ground terminal set and configured between the first ground terminal and the second ground terminal, the first signal terminal set comprising a first signal terminal and a second signal terminal, and the first signal terminal and the second signal terminal being arranged at intervals in a vertical direction; and a second signal terminal set, vertically staggered from the first ground terminal set and configured between the second ground terminal and the third ground terminal, the second signal terminal set comprising a third signal terminal and a fourth signal terminal, and the third signal terminal and the fourth signal terminal being arranged at intervals in the vertical direction:

wherein, the first terminal set has a first plane, a second plane and a third plane arranged in sequence along the vertical direction, the second signal terminal and the fourth signal terminal are configured on the first plane, the first signal terminal and the third signal terminal are configured on the second plane, and the first ground terminal, the second ground terminal and the third ground terminal are configured on the third plane.

2. The electrical connector of claim 1, wherein the all terminals of the first terminal set comprise a connecting portion, and the connecting portions of the first ground terminal set, the first signal terminal set and the second signal terminal set are arranged horizontally and in parallel.

3. The electrical connector of claim 1, wherein the first signal terminal, the second signal terminal, the third signal terminal and the fourth signal terminal comprise a bent portion respectively, the bending directions of the bent portions of the first signal terminal and the second signal terminal are symmetrical with each other, and the bending directions of the bent portions of the third signal terminal and the fourth signal terminal are symmetrical with each other.

4. The electrical connector of claim 1, wherein the length of the first signal terminal is the same as the length of the second signal terminal, and the length of the third signal terminal is the same as the length of the fourth signal terminal.

5. The electrical connector of claim 1, wherein the first signal terminal, the second signal terminal and the first ground terminal are sequentially arranged in stepped manner, and the third signal terminal, the fourth signal terminal and the second ground terminal are sequentially arranged in stepped manner.

6. The electrical connector of claim 1, further comprising:

a second terminal set, configured in the insulating case and adjacent to the first terminal set, all terminals of the second terminal set being arranged at intervals along the horizontal direction, the second terminal set comprising:

a second ground terminal set, comprising a fourth ground terminal, a fifth ground terminal and sixth ground terminal;

a third signal terminal set, vertically staggered from the second ground terminal set and configured between the fourth ground terminal and the fifth ground terminal, the third signal terminal set comprising a fifth signal terminal and a sixth signal terminal, and the fifth signal terminal and the sixth signal terminal being arranged at intervals in the vertical direction; and a fourth signal terminal set, vertically staggered from the second ground terminal set and configured between the fifth ground terminal and the sixth ground terminal, the fourth signal terminal set comprising a seventh signal terminal and an eighth signal terminal, and the seventh signal terminal and the eighth signal terminal being arranged at intervals in the vertical direction.

7. The electrical connector of claim 6, wherein the sixth signal terminal and the eighth signal terminal are configured on the third plane.

8. The electrical connector of claim 7, wherein the second terminal set has a fourth plane and a fifth plane arranged in sequence along the vertical direction, the fifth signal terminal and the seventh signal terminal are configured on the fourth plane, and the fourth ground terminal, the fifth ground terminal and the sixth ground terminal are configured on the fifth plane.

9. The electrical connector of claim 8, wherein the fifth signal terminal, the sixth signal terminal and the fourth ground terminal are sequentially arranged in stepped manner, and the seventh signal terminal, the eighth signal terminal and the fifth ground terminal are sequentially arranged in stepped manner.

10. The electrical connector of claim 6, wherein the all terminals of the second terminal set comprise a connecting portion, and the connecting portions of the second ground terminal set, the third signal terminal set and the fourth signal terminal set are arranged horizontally and in parallel.

11. The electrical connector of claim 10, wherein the insulating case comprises a first sidewall and a second sidewall opposite to the first sidewall, the first sidewall and the second sidewall form a slot, the first sidewall comprises a plurality of first terminal grooves, and the second sidewall comprises a plurality of second terminal grooves, the connecting portions of the first ground terminal set, the first signal terminal set and the second signal terminal set are respectively configured in the first terminal grooves, and the connecting portions of the second ground terminal set, the third signal terminal set and the fourth signal terminal set are respectively configured in the second terminal grooves.

* * * * *